June 18, 1957 — V. L. SOMMERS — 2,795,793
SUN VISOR
Filed May 9, 1955
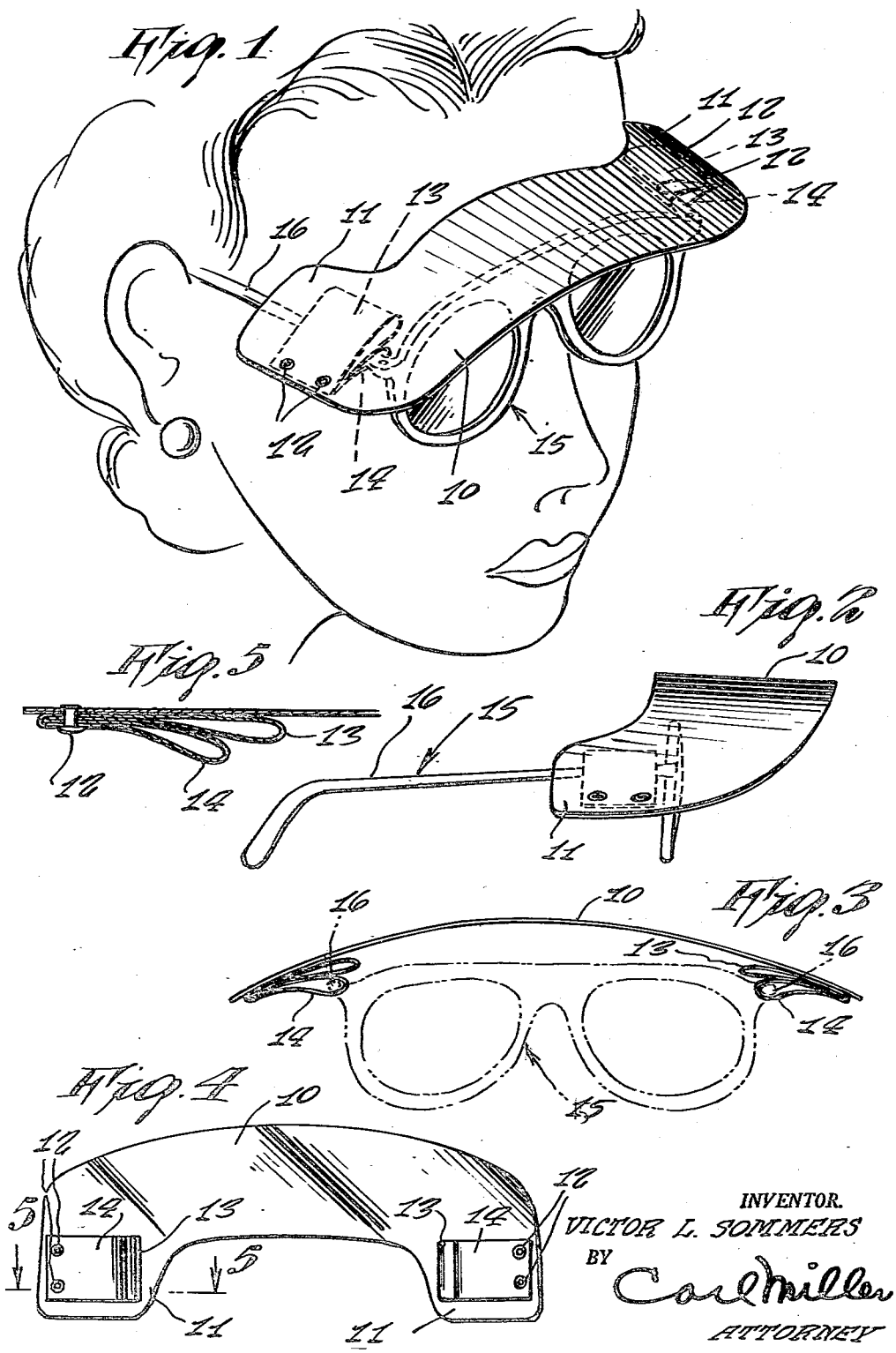
INVENTOR.
VICTOR L. SOMMERS
BY Carl Miller
ATTORNEY United States Patent Office 2,795,793
Patented June 18, 1957

2,795,793

SUN VISOR

Victor L. Sommers, Mountainhome, Pa.

Application May 9, 1955, Serial No. 506,836

3 Claims. (Cl. 2—13)

This invention relates to sun visors.

It is an object of the present invention to provide a sun visor to protect the eyes from the rays of the sun and which may be easily and readily mounted upon any conventional pair of eye glasses.

It is another object of the present invention to provide a sun visor of the above type which includes a plurality of adjustments in the mounting means so as to adapt the same to eye glasses of varying width.

It is stil another object of the present invention to provide a sun visor of the above type which is formed substantially entirely of plastic and which represents a simplified construction over the prior art.

Other objects of the present invention are to provide a sun visor having the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Figure 1 is a perspective view of a sun visor embodying the features of the present invention and shown in operative use;

Fig. 2 is a side elevational view thereof shown on the eye glasses;

Fig. 3 is a front elevational view showing the eye glasses in phantom;

Fig. 4 is a bottom plan view of the device; and

Fig. 5 is a sectional view taken along the line 5—5 of Fig. 4.

Referring now more in detail to the drawing, 10 represents a sheet of transparent green acetate or other suitable material of U-shape having the rearwardly extending side portions 11, substantially as illustrated.

On the undersurface of each of the side portions 11 a unitary strip of plastic is bent and secured by the rivets or eyelets 12, the plastic strip forming the long loop 13 which overlies the shorter loop 14, as shown in Fig. 5.

In operation, the eye glasses indicated generally at 15 are inverted and the selected loops 13, 14 are slid onto the side members 16, being pushed forwardly and retained in the forward position by abutment of the wearer's forehead with the rear edge of the visor 10, as shown in Fig. 1. It wil be noted that the overlapping loops 13, 14 of each side permit three different adjustments by passing the side members 16 through both of the longer loops 13, through both of the shorter loops 14, or through one of the shorter loops 14 and one of the longer loops 13.

While various changes may be made in the detail construction, it shall be understood that such changes shall be within the spirit and scope of the present invention as defined by the appended claims.

Having thus set forth and disclosed the nature of my invention, what is claimed is:

1. A sun visor comprising a sheet of transparent colored material integrally formed at opposite ends with rearwardly extending side portions, the rear edge of said sheet and the inwardly facing edges of said side portions being adapted to abut the forehead of the wearer, releasable adjustment means secured to the undersurface of each of said rearwardly extending portions for releasably mounting the ends of the visor in a selective one of a predetermined number of positions on the side members of a pair of eye glasses, said releasable means comprising a unitary strip of plastic having each of the ends thereof bent back upon itself an unequal amount and then folded back along a mid-portion of said strip to provide a plurality of loops of varying length on the undersurface of each of said rearwardly extending portions and means for securing said loops to the undersurface of the visor.

2. A sun visor according to claim 1, said fastening means comprising a pair of eyelets piercing the ends of the strips and the rearwardly extending portions.

3. A sun visor according to claim 2, two such loops being provided, an upper longer loop and a lower shorter loop whereby to provide three adjustments.

References Cited in the file of this patent

UNITED STATES PATENTS

| | | |
|---|---|---|
| 542,015 | Goodman | July 2, 1895 |
| 947,636 | Degges | Jan. 25, 1910 |
| 2,224,560 | Wentz | Dec. 10, 1940 |
| 2,541,242 | Grove | Feb. 13, 1951 |
| 2,762,050 | Bricker | Sept. 11, 1956 |